(12) United States Patent
Smith

(10) Patent No.: US 8,870,210 B2
(45) Date of Patent: Oct. 28, 2014

(54) ALL WHEEL 180-DEGREE STEER TRANSPORT

(75) Inventor: David R. Smith, Fort Jennings, OH (US)

(73) Assignee: Unverferth Manufacturing Company, Inc., Kalida, OH (US)

( * ) Notice: Subject to any disclaimer, the term of this patent is extended or adjusted under 35 U.S.C. 154(b) by 0 days.

(21) Appl. No.: 13/036,208

(22) Filed: Feb. 28, 2011

(65) Prior Publication Data

US 2012/0217723 A1    Aug. 30, 2012

(51) Int. Cl.
*B62D 13/02*    (2006.01)
*B62D 13/04*    (2006.01)

(52) U.S. Cl.
CPC ..................... *B62D 13/04* (2013.01)
USPC ............ 280/444; 280/442; 280/443; 280/426

(58) Field of Classification Search
USPC ................... 280/444, 442, 443, 426
See application file for complete search history.

(56) References Cited

U.S. PATENT DOCUMENTS

| | | | | |
|---|---|---|---|---|
| 3,529,848 | A  * | 9/1970 | Harvey | 280/99 |
| 3,853,330 | A  * | 12/1974 | Hanaoka | 280/99 |
| 6,619,680 | B2 * | 9/2003 | Platteeuw et al. | 280/100 |
| 6,629,701 | B1 * | 10/2003 | Colibert | 280/455.1 |
| 7,926,833 | B2 * | 4/2011 | Hellbusch | 280/442 |
| 2005/0077703 | A1* | 4/2005 | Tango | 280/442 |

\* cited by examiner

*Primary Examiner* — Joseph M Rocca
*Assistant Examiner* — Marlon Arce
(74) *Attorney, Agent, or Firm* — Rothwell, Figg, Ernst & Manbeck, P.C.

(57) ABSTRACT

A steering system for a towed farm implement or wagon, such as a header transport, is provided that allows the tongue of the header transport to pivot approximately 90 degrees to the right or the left (i.e., 180 degrees in total) and translates the movement of the tongue to all of the wheels of the header transport. Front steering linkages are coupled to the tongue, and are configured to oscillate front wheels in response to rotation of the tongue. Rear steering linkages are coupled to the front steering linkages by front-to-rear linkages, and the rear steering linkages are configured to oscillate rear wheels in response to rotation of the tongue.

15 Claims, 8 Drawing Sheets

ALL WHEEL 180-DEGREE STEER TRANSPORT

BACKGROUND OF THE INVENTION

1. Field of the invention

The present invention relates generally to a steering system for a towed farm implement. More particularly, the present invention relates to a four-wheel steering mechanism with a 180-degree steering system for a header transport.

2. Description of the Related Art

Towed farm implements can be difficult to turn at a sharp angle. For example, header transports generally include a tongue that can be coupled to a towing vehicle (e.g., a tractor) that pulls the header transport. Steering systems for towed farm implements exist in which the tongue of the wagon is pivoted as it is pulled, and the angle at which the tongue pivots is translated to the wheels. However, existing steering systems are only able to achieve a low degree of tongue movement. The limited range of movement makes it hard to maneuver during towing. Further, the limited range of movement causes the front tires to slide sideways during constricted maneuvers, which results in tire damage and puts undue stress on the transporter frame and joints.

Thus, there is a need for a new and improved steering system for towed form implements, such as header transports.

SUMMARY OF THE INVENTION

According to an embodiment of the present invention, a steering system for a towed implement is provided. The towed implement has a frame. The steering system includes a tongue pivotably coupled to a front support beam of the frame such that the tongue is capable of rotating approximately 180 degrees. The steering system further includes a plurality of wheels pivotably coupled with the frame. The steering system also includes front steering linkages coupled to the tongue and configured to oscillate front wheels of the plurality of wheels in response to rotation of the tongue, and rear steering linkages coupled to the front steering linkages by front-to-rear linkages configured to oscillate rear wheels of the plurality of wheels in response to rotation of the tongue.

According to an embodiment of the present invention, the tongue includes a lip including a protrusion. The front steering linkages can be rotatably coupled to the tongue protrusion.

According to an embodiment of the present invention, the front-to-rear connecting linkage causes a rear right wheel coupling and a rear left wheel coupling to turn in the opposite direction of a front right wheel coupling and a front left wheel coupling.

According to an embodiment of the present invention, the front support beam includes a top protrusion and a bottom protrusion extending outwardly from a front face of the front support beam. The tongue can be pivotably coupled to the top protrusion and the bottom protrusion of the front support beam. The tongue can be pivotably coupled to the top protrusion and the bottom protrusion by a pin.

According to an embodiment of the present invention, the front steering linkages include a front right link and a front left link. The front right link can be coupled to the tongue and a front right wheel coupling, and the front left link can be coupled to the tongue and a front left wheel coupling. The front right wheel coupling can be rotatably coupled to the front support beam, and the front left wheel coupling is rotatably coupled to the front support beam.

According to an embodiment of the present invention, the rear steering linkages includes a rear link coupled to a rear right wheel coupling and a rear left wheel coupling. The rear right wheel coupling can be rotatably coupled to a rear support beam, and the rear left wheel coupling can be rotatably coupled to the rear support beam.

According to an embodiment of the present invention, the front-to-rear connecting linkages include a front connecting link, a front connecting coupling, a rear connecting link, a rear connecting coupling and a front-to-rear connecting link. The front connecting link can be coupled to the front steering linkages and the front connecting coupling. The rear connecting link can be coupled to the rear steering linkages and the rear connecting coupling, and the front-to-rear connecting link can be coupled to the front connecting coupling and the rear connecting coupling. In another embodiment of the present invention, the rear connecting coupling includes at least two coupling points for the connecting link, wherein each location causes the rear steering linkage to oscillate the rear wheels at a different ratio relative to the oscillation of the front wheels.

According to an embodiment of the present invention, a header transport steering system for a towed farm implement with a plurality of wheels includes means for pulling the header transport, wherein the means for pulling can be pivotably coupled to a front supporting means and capable of rotating approximately 180 degrees. The steering system further includes means for steering front wheels of the plurality of wheels coupled to the means for pulling, wherein the means for steering front wheels oscillates the wheels in response to rotation of the means for pulling. The steering system also includes means for steering rear wheels coupled to the means for steering front wheels by a means for connecting front-to-rear steering means, wherein the means for steering rear wheels oscillates the wheels in response to rotation of the means for pulling.

According to an embodiment of the present invention, the means for connecting front-to-rear steering means is capable of being adjusted to change the ratio at which the means for steering rear wheels turns the rear wheels of the plurality of wheels relative to the front wheels of the plurality of wheels.

The above and/or other aspects, features and/or advantages of various embodiments will be further appreciated in view of the following description in conjunction with the accompanying figures. Various embodiments can include or exclude different aspects, features or advantages where applicable. In addition, various embodiments can combine one or more aspects, features, or advantages where applicable. The descriptions of the aspects, features, or advantages of a particular embodiment should not be construed as limiting any other embodiment of the claimed invention.

DETAILED DESCRIPTION OF THE DRAWINGS

While the present invention may be embodied in many different forms, a number of illustrative embodiments are described herein with the understanding that the present disclosure is to be considered as providing examples of the principles of the invention and such examples are not intended to limit the invention to the preferred embodiment described herein and/or illustrated herein.

In an embodiment of the present invention, a steering system for a towed farm implement or wagon, such as a header transport, is provided that allows the tongue of the header transport to pivot approximately 90 degrees to the right or the left (i.e., 180 degrees in total) and translates the movement of the tongue to all of the wheels of the header transport.

Figure 1:
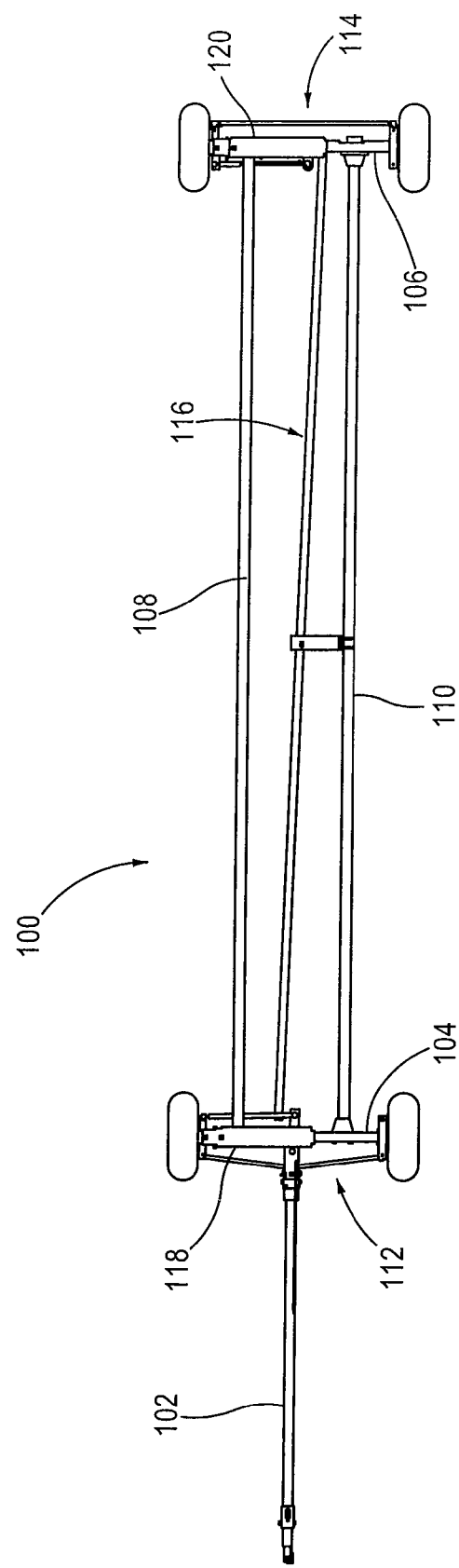
FIG. 1 is a top view of a header transport according to an embodiment of the present invention.

FIG. 1 is a top view of a header transport with an all-wheel 180-degree steering system according to an embodiment of the present invention. The header transport 100 includes a support frame formed by a front support beam 104, a rear support beam 106 and side support beams 108 and 110. The frame beams can be connected by connecting means such as by bolts or welding. The header transport is a 4-wheel transport and accordingly, wheels can be provided at the ends of beams 104 and 106. All four wheels are turnable and are, therefore, rotatably coupled to the frame. A front steering linkage 112, a rear steering linkage 114 and a connecting linkage 116 are provided. A tongue 102 is pivotably coupled to the front support beam 104. The linkages are mechanically coupled with the tongue 102 so that movement of the tongue 102 controls the oscillation (rotation) of the wheels of the header transport.

In an embodiment of the present invention, the header transport 100 includes a front rest bracket 118 and a rear rest bracket 120. The front rest bracket 118 is coupled to the front support beam 104 and the rear rest bracket 120 is coupled to the rear support beam 106. The rest brackets 118 and 120 are configured to support a large object to be transported, such as a header or grain platform. In an embodiment of the present invention, rest brackets 118 and 120 can be adjustable such that the angle of the rest bracket 118 and 120 relative to the support beam it is coupled to can be changed.

Figure 2:
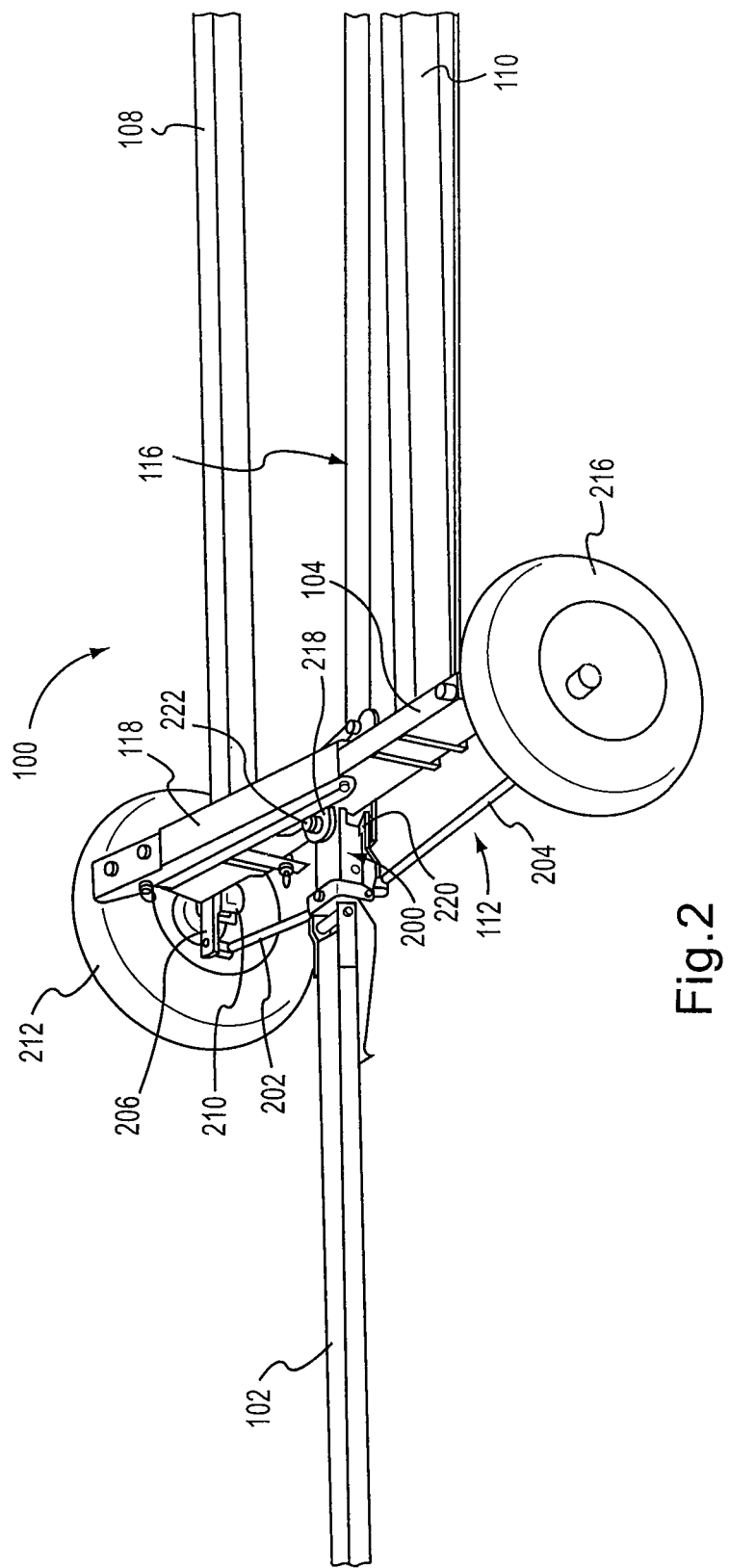
FIG. 2 is a perspective view of the front steering linkage of a header transport according to an embodiment of the present invention.

FIG. 2 illustrates the front steering linkage 112 of a header transport according to an embodiment of the present invention. The front steering linkage 112 is adapted to translate the movement of the tongue 102 to the front wheels 212 and 216 such that, as the tongue 102 is pivoted left or right, the front wheels oscillate in the direction that the tongue is being pivoted, up to 180 degrees.

As shown, in the neutral position, the tongue 102 is disposed approximately perpendicular to the front face of the front support beam 104. The tongue 102 can be pivotably connected to the front support beam 104 at joint 200. The tongue 102 is capable of rotating 180 degrees about the joint 200. The front steering linkage 112 can include a front right link 202, a front left link 204, a front right wheel coupling 206 and a front left wheel coupling 208 (See FIG. 4). The front right link 202 and the front left link 204 can be pivotably coupled to the tongue 102 on one end and the wheels 212 and 216 on the other end. Thus, as the tongue 102 is rotated about the joint 200, the front right link 202 and the front left link 204 are pushed or pulled by the movement of the tongue 102, thereby, turning wheels 212 and 216.

Wheel couplings 206 and 208 (See FIG. 4) can be provided. The front right link 202 can be connected to the front right wheel coupling 206. The front right wheel coupling 206 can be rotatably coupled to the front support beam 104. The front left link 204 can be connected to the front left wheel coupling 208. The front left wheel coupling 208 can be rotatably coupled to the front support beam 104. The front right wheel coupling 206 can be coupled to the axle 210 of the front right wheel 212. The front left wheel coupling 208 can be coupled to the axle 214 (See FIG. 4) of the front left wheel 216.

In an embodiment of the present invention, the front support beam 104 includes an extension 218 to accommodate joint 200. The joint 200 can include a pin 222. The tongue 102 can be pivotably connected to the front support beam 106 by a pin 222 that passes through the extension 218 and the tongue 102.

Figure 3:
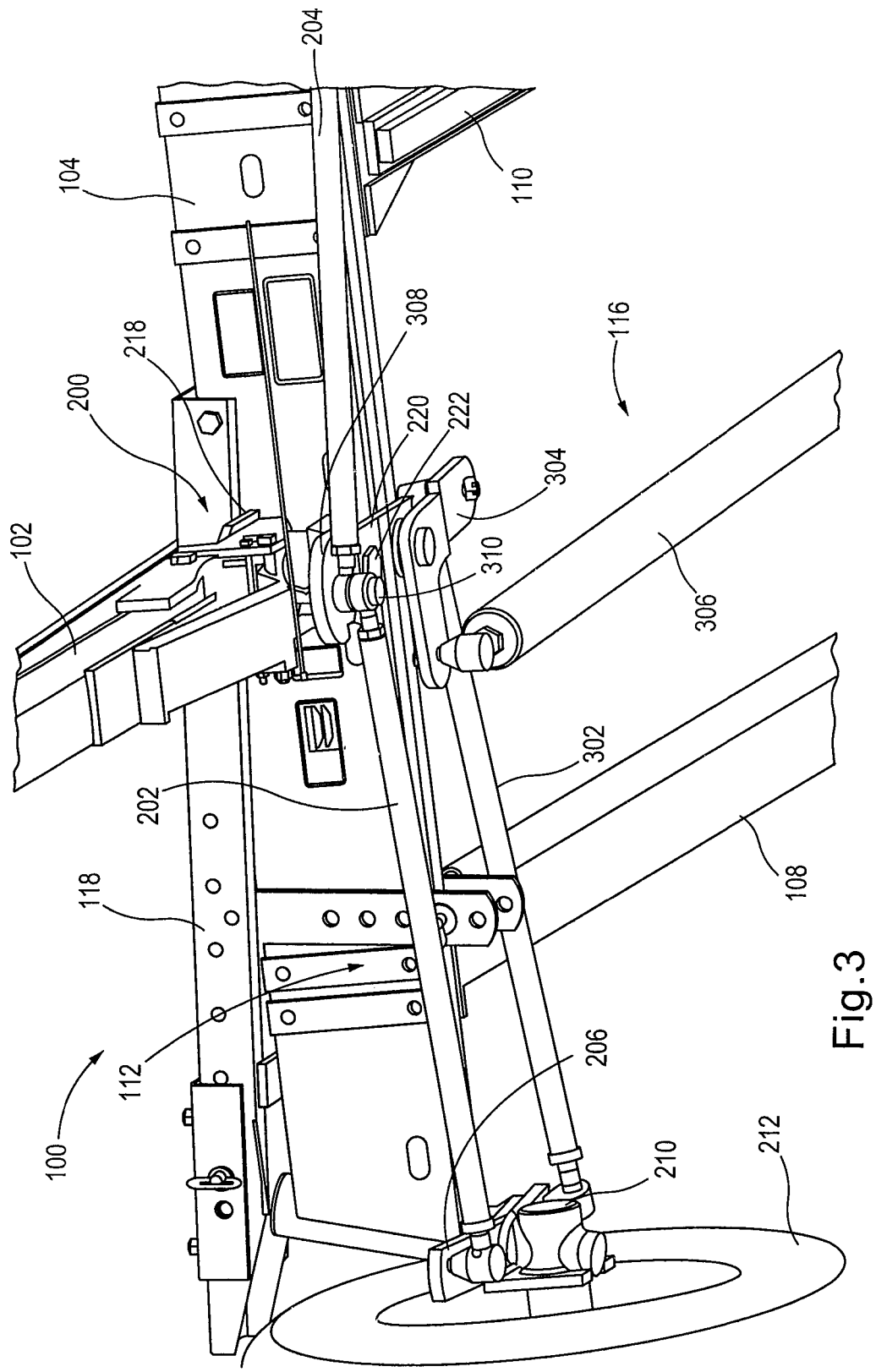
FIG. 3 is a perspective view of the bottom of the front steering linkage of a header transport according to an embodiment of the present invention.

FIG. 3 illustrates a bottom perspective view of a front steering linkage of a transport header according to an embodiment of the present invention. As shown, the tongue 102 is in the neutral position, approximately perpendicular to the front face of the front support beam 104. The front portion of the front-to-rear connecting linkage or the connecting linkage 116 is shown. The connecting linkage 116 can mechanically connect the front steering linkage 112 to the rear steering linkage 114. The connecting linkage 116 translates the oscillation of the front wheels 212 and 216 caused by the front steering linkage 112 to the rear steering linkage 114. The rear steering linkage 114 is adapted to cause the rear wheels 610 and 614 (See FIG. 6) to oscillate in response to the movement of the connecting linkage 116. In an embodiment of the present invention, the connecting linkage 116 is adjustable so that the rear wheels 610 and 614 can oscillate at various ratios relative to the oscillation of the front wheels 212 and 216.

Figure 6:
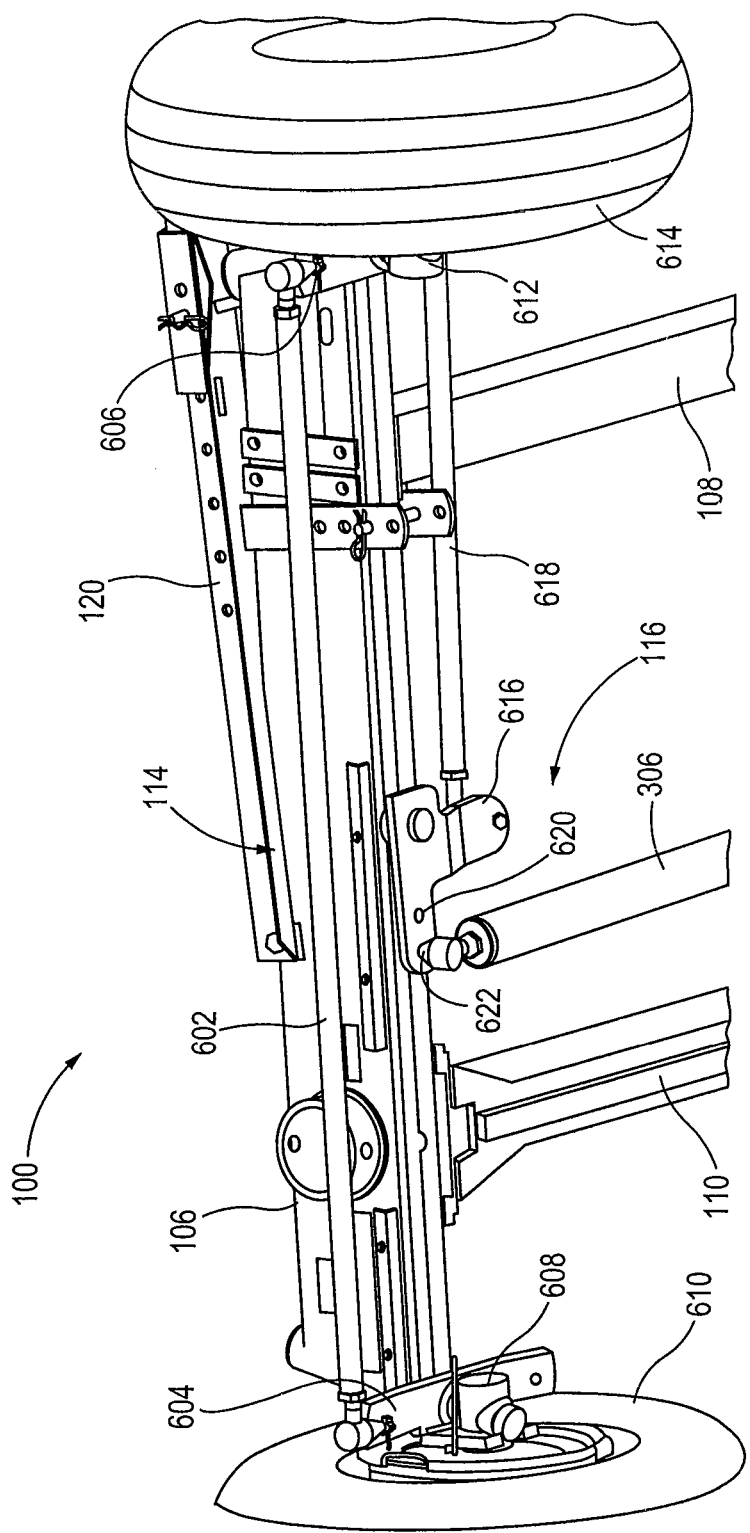
FIG. 6 is a perspective view of the bottom of the rear steering linkage of a header transport according to an embodiment of the present invention.

The connecting linkage 116 includes a front connecting link 302, a front connecting coupling 304, a rear connecting coupling 616 (See FIG. 6), and a rear connecting link 618 (See FIG. 6). One of the front wheel couplings, in this case, the front right wheel coupling 206, can be coupled to the front connecting link 302. The front connecting link 302 can be coupled to the front connecting coupling 304. The front connecting coupling 304 can be coupled to the connecting link 306. The connecting link 306 can be coupled to the rear connecting coupling 616. The connecting link 306 translates movement in the front steering linkage 112 to the rear steering linkage 114. In an embodiment of the present invention, the front connecting coupling 304 is approximately L-shaped with the front connecting link 302 coupled to the end of one end and the connecting link 306 coupled to the opposite end.

In an embodiment of the present invention, the tongue 102 can include a lip 308 that extends beyond the bottom protrusion 220 of the front support beam 104 and a protrusion 310 that extends outwardly from the lip 308 towards the ground. In an embodiment of the present invention, the front right link 202 and the front left link 204 can be rotatably coupled to the protrusion 310 such that, when the tongue 102 is pivoted, the front right link 202 and the front left link 204 are push or pulled by the protrusion 310.

Figure 4:
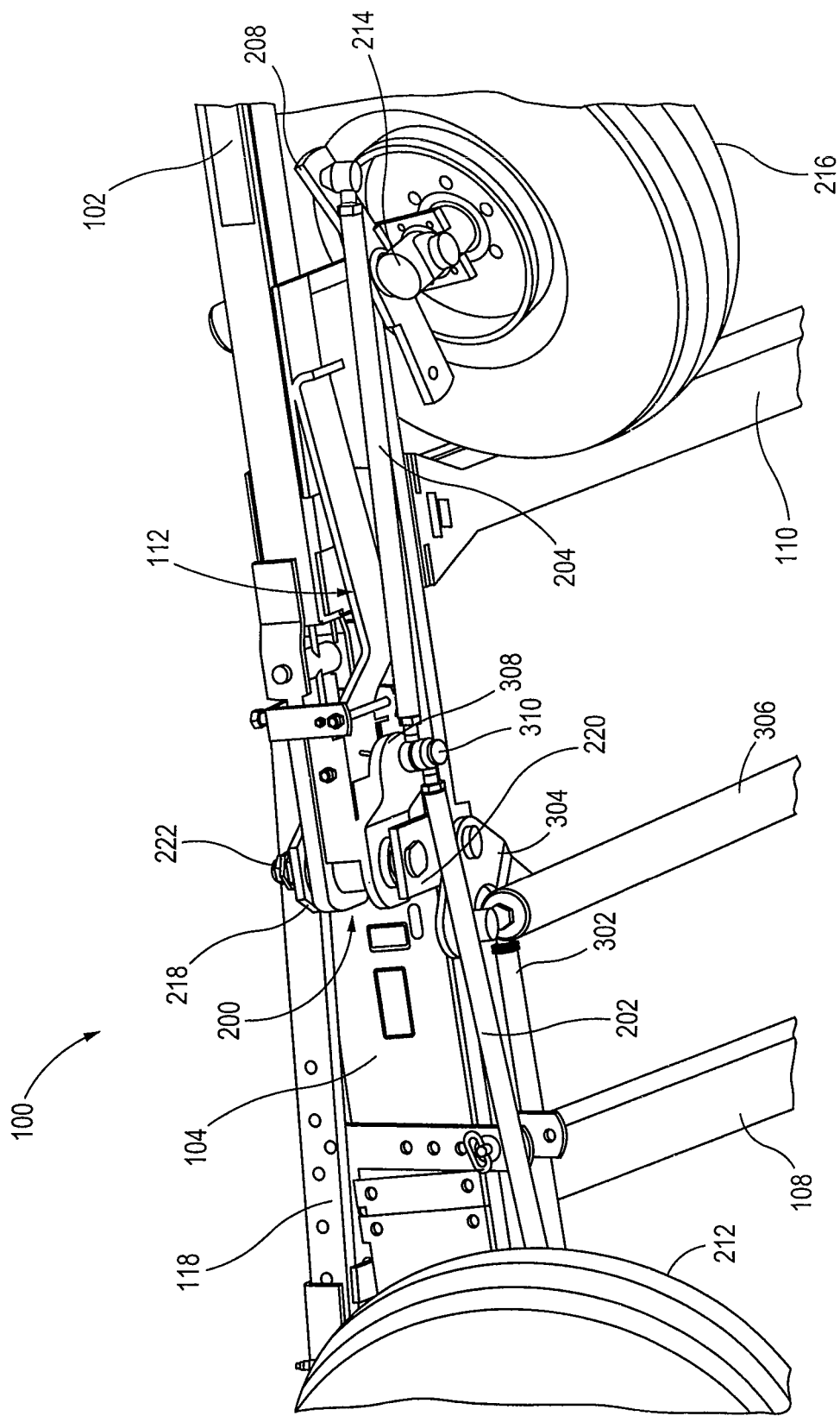
FIG. 4 is a perspective view of the bottom of the front steering linkage of a header transport turned 90 degrees left according to an embodiment of the present invention.

FIG. 4 illustrates a view of the front steering linkage when the tongue 102 is turned a full 90 degrees to the left, according to an embodiment of the present invention. The tongue 102 can be made possible to turn a full 90 degrees to the side by providing extension 218 (i.e., the extension 218 protrudes outwardly from the front support beam 104 such that nothing inhibits the rotation of the tongue 102 90 degrees to either side). Further, the oscillation of the wheels 212 and 216 as the tongue 102 is pivoted allows the tongue 218 to rotate 90 degrees to either side without being inhibited by the wheels (i.e., as the tongue 102 is rotated to the left, the front left wheel 216 oscillates to the left such that the front portion of the wheel, which protrudes beyond the front support beam in a neutral position (See FIG. 2), will not block the tongue 102 from rotating 90 degrees).

According to an embodiment of the present invention, as the tongue 102 is pivoted to the left, the front steering linkage 112 drives the front wheels 212 and 216 to oscillate to the left. The tongue 102 rotates about the pivot 200 to the left, and, as the tongue 102 rotates, the front right link 202 is pulled to the left and the front left link 204 is pushed to the left. As the front left link 204 is pushed to the left, the front portion of the front left coupling 208 is rotated to the left. The rotation of the front left coupling 208 drives the front left wheel 216 to oscillate into a left turn position. As the front right link 202 is pulled to the left, the front portion of the front right coupling 206 (not shown) is rotated to the left, and the front right wheel 212 is oscillated into a left turn position. The connecting linkage 116 translates the oscillation of the front wheels 212 and 216 to the left to the rear steering linkage 114, which causes the rear wheels 610 and 614 to oscillate. The rotation of the front right coupling 206 drives the front connecting link 302 towards the right, and this causes the front connecting coupling 304 to rotate in the direction of the pulling. The rotation of the front connecting coupling 304 drives the connecting link 306 towards the front of the header transport, and this causes the connecting link 306 to rotate the rear connecting coupling 616 (See FIG. 6). The rotation of the rear connecting coupling 616 causes the rear steering linkage 114 to turn the rear wheels.

Figure 5:
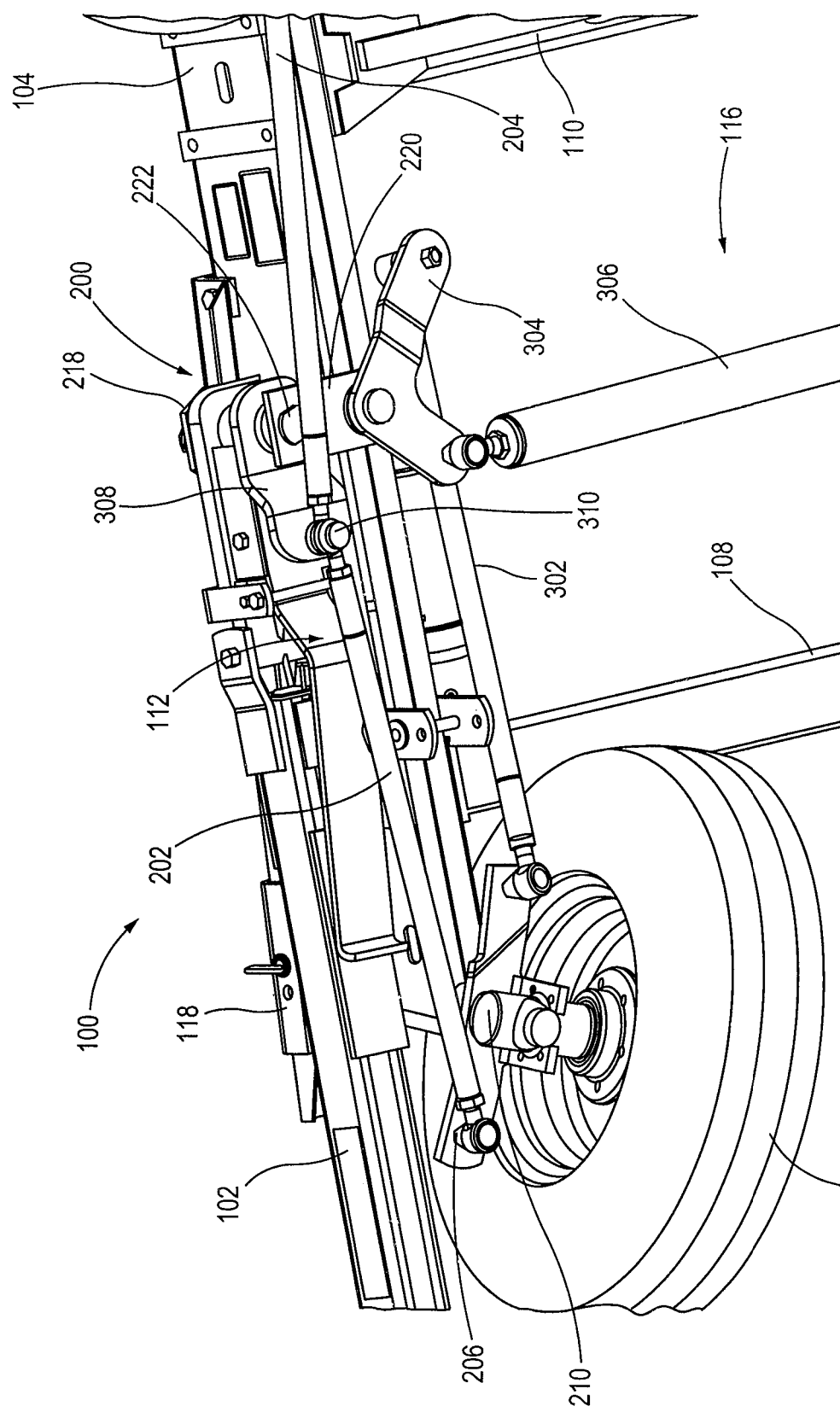
FIG. 5 is a perspective view of the bottom of the front steering linkage of a header transport turned 90 degrees right according to an embodiment of the present invention.

FIG. 5 illustrates a view of the front steering linkage when the tongue 102 is turned a full 90 degrees to the right, according to an embodiment of the present invention. As discussed above, the tongue 102 is able to turn a full 90 degrees to the side because of the configuration of the extension 218 and the oscillation of the front wheels 212 and 216. The front right wheel 212 oscillates to the right such that the front portion of the wheel, which protrudes beyond the front support beam in a neutral position (See FIG. 2), will not block the tongue 102 from rotating 90 degrees.

According to an embodiment of the present invention, as the tongue 102 is pivoted to the right, the front steering linkage 112 drives the front wheels 212 and 216 to oscillate to the right. As the tongue 102 is rotated, the front right link 202 is pushed to the right and the front left link 204 is pulled to the right. As the front left link 204 is pulled to the right, the front portion of the front left coupling 208 (not shown) is rotated to the right. The rotation of the front left coupling 208 drives the front left wheel 216 (not shown) to oscillate into a right turn position. As the front right link 202 is pushed to the right, the front portion of the front right coupling 206 is rotated to the right, and the front right wheel 212 is oscillated into a right turn position. The rotation of the front right coupling 206 drives the front connecting link 302 towards the left, and this causes the front connecting coupling 304 to rotate in the direction of the pushing. The rotation of the front connecting coupling 304 drives the connecting link 306 towards the rear of the header transport, and this causes the connecting link to rotate the rear connecting coupling 616 (See FIG. 6).

FIG. 6 illustrates a view of the rear steering linkage of a header transport according to an embodiment of the present invention. The rear steering linkage 114 can be similar to the front steering linkage. As shown, the rear steering linkage 114 can be connected to the front steering linkage 112 by the connecting linkage 116. The movement of the tongue 102 is translated to the rear wheels 610 and 614 through the rear steering linkage 114 via the front steering linkage 112 and the connecting linkage 116, as will be discussed in further detail below.

In an embodiment of the present invention, the rear steering linkage 114 can include a rear link 602, a rear left wheel coupling 604 and a rear right wheel coupling 606. The rear left wheel coupling 604 can be rotatably coupled to the rear support beam 106. The rear right wheel coupling 606 can be rotatably coupled to the rear support beam 106. The rear link 602 can be coupled to the rear left wheel coupling 604 and the rear right wheel coupling 606 such that movement in either coupling is translated to the other coupling. The rear left wheel coupling 604 can be coupled to the rear left wheel axle 608. The rear left wheel axle 608 can be coupled to the rear left wheel 610. The rear right wheel coupling 606 can be coupled to the rear right wheel axle 612. The rear right wheel axle 612 can be coupled to the rear right wheel 614.

The rear potion of the connecting linkage 116 is visible in FIG. 6. In an embodiment of the present invention, the connecting linkage 116 can include a rear connecting coupling 616 and a rear connecting link 618. The rear connecting coupling 616 can be coupled to the connecting link 306. The rear connecting link 618 can be coupled to the rear connecting link 616 and the rear right wheel coupling 606. The connecting linkage 116 can be configured to translate movement in the front steering linkage 112 to the rear steering linkage 114 through the connecting link 306 coupled to the front connecting coupling 304 and the rear connecting coupling 616. Rotation in the front connecting coupling 304 is translated to the rear connecting coupling 616 through the connecting link 306, and the movement of the rear connecting coupling 616 causes the rear connecting link 618 to rotate the rear right wheel coupling 606. The rotation of the right wheel coupling 606 causes the rear link 602 to be pushed or pulled, and this causes the left wheel coupling 604 to be rotated.

In an embodiment of the present invention, the rear connecting coupling 616 has at least two coupling points 620 and 622. The connecting link 306 can be coupled to the rear connecting coupling 616 at any of the coupling points 620 and 622. Each coupling point 620 and 622 causes the rear steering linkage 114 to oscillate the rear wheels 610 and 614 at a different ratio relative to the front wheels 212 and 216.

Figure 7:
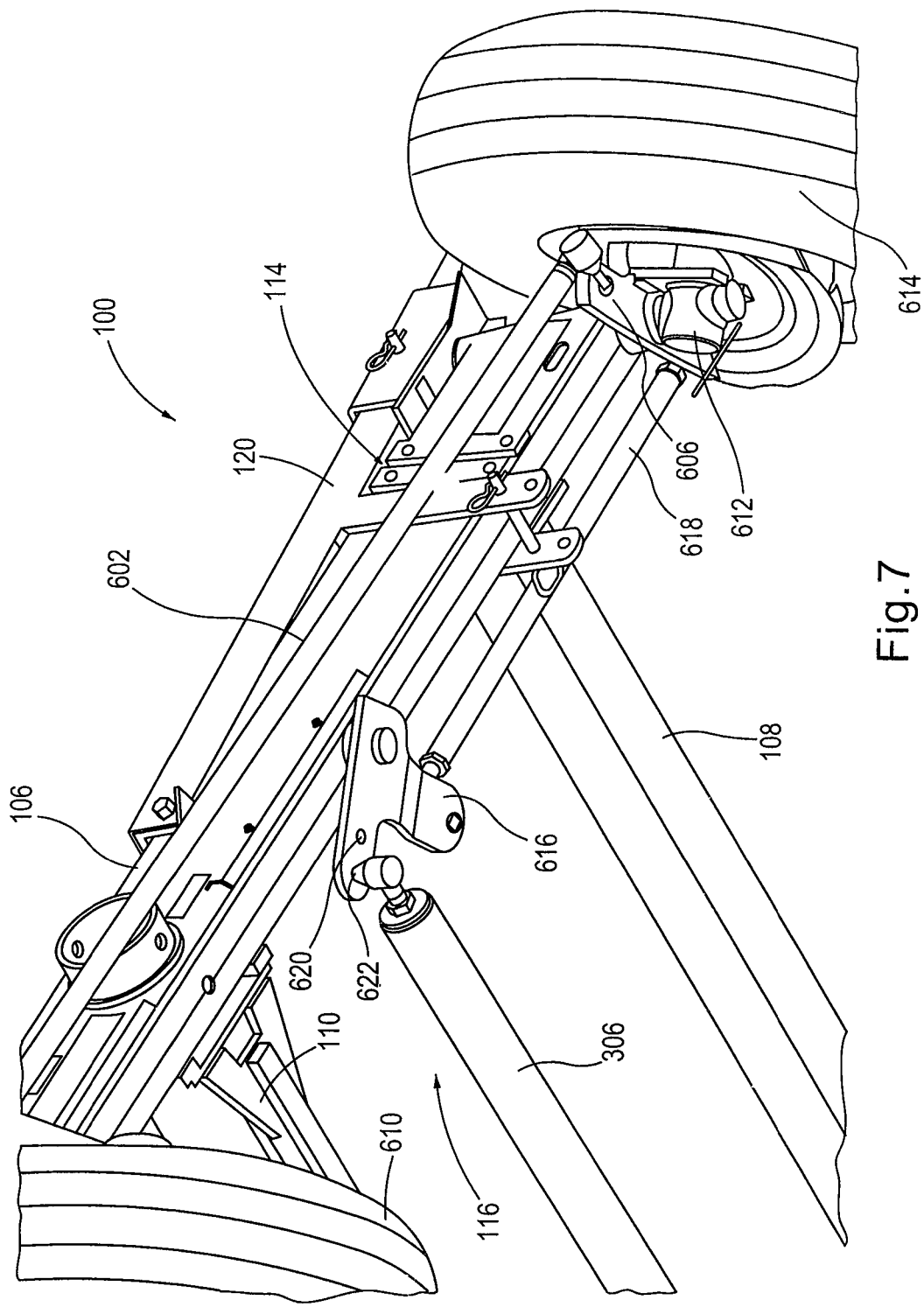
FIG. 7 is a perspective view of the bottom of the rear steering linkage of a header transport turned 90-degrees left according to an embodiment of the present invention.

FIG. 7 illustrates a view of a rear steering linkage of a header transport in a left turning position according to an embodiment of the present invention. As discussed above, when turning left, the tongue 102 is pivoted to the left, which causes the front steering linkage 112 to oscillate the front wheels 212 and 216 to the left. The rotation of the front right wheel coupling 206 causes the front connecting link 302 to rotate the front connecting coupling 304. The rotation of the front connecting coupling 304 causes the connecting link 306 to be pulled towards the front of the header transport 100, and this causes the connecting link 306 to rotate the rear connecting coupling 616. The rotation of the rear connecting coupling 616 causes the rear wheels 610 and 614 to oscillate. In an embodiment of the present invention, the rear wheels 610 and 614 oscillate in the opposite direction of the front wheels 212 and 216, thus reducing the turning radius of the header transport 100. The connecting link 306 can be coupled to the rear connecting coupling 616 at any of the coupling points 620 and 622, and the various coupling points cause the rear connecting coupling 616 to rotate at different ratios relative to the front connecting coupling 304, which causes the rear wheels 610 and 614 to oscillate at different ratios relative to the front wheels 212 and 216.

Figure 8:
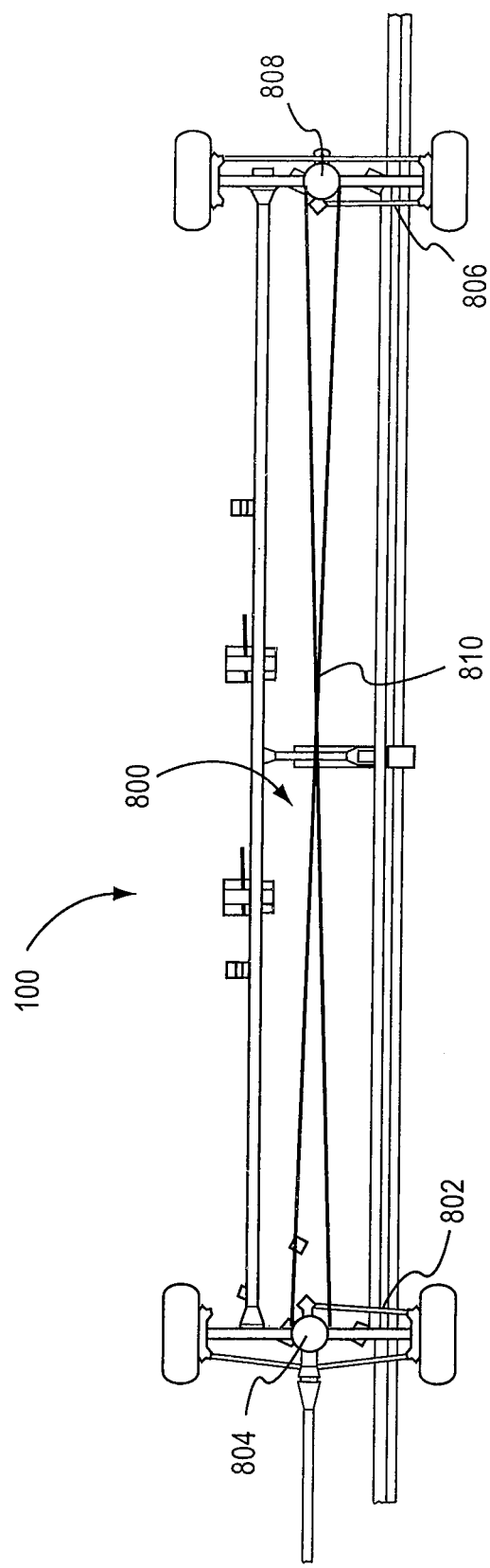
FIG. 8 is a bottom view of the connecting linkage of a header transport according to an embodiment of the present invention.

FIG. 8 illustrates a view of the connecting linkage of a header transport according to an alternative embodiment of the present invention. In an alternative embodiment of the present invention, the connecting linkage 800 includes a front connecting link 802, a front connecting coupling 804, a rear connecting link 806, a rear connecting coupling 808 and a connecting link 810. The front connecting coupling 804 can be a pulley sector, and the rear connecting coupling 808 can be a pulley sector. The connecting link 810 can be a cable adapted to transmit motion of the front connecting coupling 804 to the rear connecting coupling 808. In an embodiment of the present invention, the connecting link 810 can be two cables. The ratio of movement of the rear connecting coupling 808 relative to the front connecting coupling 804 can be adjusted by sizing the pulley sectors appropriately.

Thus, a number of preferred embodiments have been fully described above with reference to the drawing figures. Although the invention has been described based upon these preferred embodiments, it would be apparent to those of skill in the art that certain modifications, variations, and alternative constructions could be made to the described embodiments within the spirit and scope of the invention. For example, the steering system could be used on any farm implement that is towed.

I claim:

1. A steering system for a towed implement, said towed implement having a frame, said steering system comprising:
    a front support beam of said frame including a top protrusion and a bottom protrusion each extending outwardly from a front face of said front support beam;
    a tongue pivotably coupled to said top protrusion and said bottom protrusion of said front support beam such that said tongue is capable of rotating approximately 180 degrees about a point of coupling, wherein said tongue includes a lip extending downwardly from a surface of the tongue beyond at least one of the top protrusion and the bottom protrusion;
    a plurality of wheels pivotably coupled with said frame;
    front steering linkages coupled to said lip of said tongue and configured to oscillate front wheels of said plurality of wheels in response to rotation of said tongue; and
    rear steering linkages coupled to said front steering linkages by front-to-rear linkages configured to oscillate rear wheels of said plurality of wheels in response to rotation of said tongue.

2. The system of claim 1, wherein said lip includes a protrusion.

3. The system of claim 2, wherein said front steering linkages are rotatably coupled to said lip protrusion.

4. The system of claim 1, wherein said front-to-rear connecting linkage causes a rear right wheel coupling and a rear left wheel coupling to turn in the opposite direction of a front right wheel coupling and a front left wheel coupling.

5. The system of claim 1, wherein said tongue is pivotably coupled to said top protrusion and said bottom protrusion by a pin.

6. The system of claim 1, wherein said front steering linkages include a front right link and a front left link, and said front right link is coupled to said tongue and a front right wheel coupling and said front left link is coupled to said tongue and a front left wheel coupling.

7. The system of claim 6, wherein said front right wheel coupling is rotatably coupled to said front support beam and said front left wheel coupling is rotatably coupled to said front support beam.

8. The system of claim 1, wherein said rear steering linkages includes a rear link coupled to a rear right wheel coupling and a rear left wheel coupling.

9. The system of claim 8, wherein said rear right wheel coupling is rotatably coupled to a rear support beam and said rear left wheel coupling is rotatably coupled to said rear support beam.

10. The system of claim 1, wherein said lip extends downwardly from a bottom surface of the tongue beyond the bottom protrusion.

11. A steering system for a towed implement, said towed implement having a frame, said steering system comprising:
    a tongue pivotably coupled to a front support beam of said frame such that said tongue is capable of rotating approximately 180 degrees about a point of coupling;
    a plurality of wheels pivotably coupled with said frame;
    front steering linkages coupled to said tongue and configured to oscillate front wheels of said plurality of wheels in response to rotation of said tongue; and
    rear steering linkages coupled to said front steering linkages by front-to-rear connecting linkages configured to oscillate rear wheels of said plurality of wheels in response to rotation of said tongue,
    wherein said front-to-rear connecting linkages include a front connecting link, a front connecting coupling, a rear connecting link, a rear connecting coupling and a front-to-rear connecting link.

12. The system of claim 11, wherein said front connecting link is coupled to said front steering linkages and said front connecting coupling, said rear connecting link is coupled to said rear steering linkages and said rear connecting coupling, and said front to rear connecting link is coupled to said front connecting coupling and said rear connecting coupling.

13. The system of claim 11, wherein said rear connecting coupling includes at least two coupling points for said connecting link, wherein each location causes the rear steering linkage to oscillate the rear wheels at a different ratio relative to the oscillation of the front wheels.

14. The system of claim 11, wherein said front connecting coupling is a pulley, and said rear connecting coupling is a pulley.

15. A header transport steering system for a towed farm implement with a plurality of wheels, comprising:
    means for coupling said towed farm implement to a towing vehicle, wherein said means for coupling is pivotably coupled to a front supporting means such that said means for coupling is capable of rotating approximately 180 degrees;
    means for steering front wheels of said plurality of wheels coupled to said means for coupling, wherein said means for steering front wheels oscillates said wheels in response to rotation of said means for coupling; and
    means for steering rear wheels coupled to said means for steering front wheels by a means for connecting front-to-rear steering means, wherein said means for steering rear wheels oscillates said wheels in response to rotation of said means for coupling,
    wherein said means for connecting front-to-rear steering means is capable of being adjusted to change the ratio at which the means for steering rear wheels turns said rear wheels of said plurality of wheels relative to the front wheels of said plurality of wheels.

\* \* \* \* \*